(12) United States Patent
Vasiloglou et al.

(10) Patent No.: US 10,146,740 B1
(45) Date of Patent: Dec. 4, 2018

(54) SPARSE DATA SET PROCESSING

(71) Applicant: Symantec Corporation, Mountain View, CA (US)

(72) Inventors: Nikolaos Vasiloglou, Atlanta, GA (US); Andrew B. Gardner, Roswell, GA (US)

(73) Assignee: Symantec Corporation, Mountain View, CA (US)

( * ) Notice: Subject to any disclaimer, the term of this patent is extended or adjusted under 35 U.S.C. 154(b) by 14 days.

(21) Appl. No.: 15/452,883

(22) Filed: Mar. 8, 2017

(51) Int. Cl.
*G06F 17/16* (2006.01)
*G06F 15/80* (2006.01)
*G06F 21/56* (2013.01)

(52) U.S. Cl.
CPC .......... *G06F 17/16* (2013.01); *G06F 15/8053* (2013.01); *G06F 21/56* (2013.01)

(58) Field of Classification Search
CPC .............................. G06F 15/8069; G06F 17/16
See application file for complete search history.

(56) References Cited

U.S. PATENT DOCUMENTS

| 2013/0159373 A1* | 6/2013 | Hatsutori | G06F 17/18 708/520 |
| 2015/0269122 A1* | 9/2015 | Lang | G06Q 30/0269 708/607 |
| 2016/0179750 A1* | 6/2016 | Zhou | G06F 17/16 708/203 |

OTHER PUBLICATIONS

Weber, Daniel et al., "Efficient GPU Data Structures and Methods to Solve Sparse Linear Systems in Dynamics Applications." Computer Graphics Forum, 1981, pp. 1-12, vol. 0, No. 0.

* cited by examiner

*Primary Examiner* — Chuong D Ngo
(74) *Attorney, Agent, or Firm* — Patent Law Works LLP

(57) ABSTRACT

A computer implemented method is provided for processing sparse data. A sparse data set is received. A modified sparse data set is calculated by replacing all nonzero values in the sparse data set with a common positive integer. The modified sparse data set is transposed to create a transposed data set. A covariance matrix is calculated by multiplying the transposed data set by the modified sparse data set. A tree of a predefined depth is generated by assigning columns of the sparse data set to right and left nodes based on co-occurrence with a first anchor column and a second anchor column. The first anchor column and the second anchor column are determined based on the covariance matrix.

14 Claims, 4 Drawing Sheets

SPARSE DATA SET PROCESSING

TECHNICAL FIELD

This disclosure pertains generally to efficient use of vector processors, and more specifically to sparse data set processing.

BACKGROUND

Sparse data sets need to be processed in a variety of computational applications. For example, machine learning, computer modeling and data mining, amongst others, rely on the generation and efficient processing of sparse data sets. Sparse data sets are often stored and/or processed as a two-dimensional array of allocated memory in a computer.

While graphics processing units (GPUs) were originally designed to accelerate the rendering of graphical images for output to a display device, increasingly GPUs are being used for non-graphical calculations. Because of the parallel nature of many matrix calculations, modern GPUs, or other types of stream processors, are oftentimes particularly suited to perform such calculations on matrices.

Processors, including GPUs, oftentimes include one or more layers of cache memory. Cache memory is intended to speed up processor memory access by moving data that is likely to be accessed to quicker memory hardware. One such example of quicker memory hardware is static random-access memory (SRAM). Where data requested by the processor is not in a particular cache memory level, the request is said to be a cache miss. Cache misses may slow down the overall computation being performed by a processor. Due to their sparse nature, processing of sparse data sets on GPUs or other types of stream processors may be particularly prone to cache misses in certain instances.

It would be desirable to address these issues.

SUMMARY

The processing of sparse data is performed with a computer implemented method. A sparse data set is received. A modified sparse data set is calculated by replacing all nonzero values in the sparse data set with a common positive integer. The modified sparse data set is transposed to create a transposed data set. A covariance matrix is calculated by multiplying the transposed data set by the modified sparse data set. A tree of a predefined depth is generated iteratively. An element of the covariance matrix is determined from an unassigned set of columns to have a maximum value which corresponds to a row and a column in the covariance matrix. A first anchor column and a second anchor column is determined in the sparse data set based respectively on the row and the column in the covariance matrix. A right node is assigned columns that co-occur more with the first anchor column than the second anchor column. A left node is assigned columns that co-occur more with the second anchor column than the second anchor column.

In some embodiments, the sparse data set is traversed based on the tree. In some embodiments, the traversing of the sparse data set is performed on a graphics processing unit (GPU). In some embodiments, the first anchor column and the second anchor column are determined by: calculating a co-occurrence of each of the unassigned set of columns with the row that corresponds to the maximum value, calculating a frequency of each of the unassigned set of columns with the column that corresponds to the maximum value, setting as the first anchor column the column of the unassigned set of columns that corresponds with the row, and selecting as the second anchor column, the column with the lowest calculated co-occurrence and the highest calculated frequency. In some embodiments, the sparse data set is used as part of a machine learning algorithm. In some embodiments, the sparse data set is received as a dictionary of keys, a list of lists, or a coordinate list. In some embodiments, the sparse data set is received as a compressed sparse row or a compressed sparse column. In some embodiments, the calculation of the covariance matrix is an approximation based on a sampling of multiplication of the transposed data set by the modified sparse data set. In some embodiments, the tree is a binary tree with less than or equal to 10 generations of nodes. In some embodiments, the common positive integer is 1. In some embodiments, the sparse data set is used as part of a classifier. In some embodiment, the classifier and the sparse data set are used as part of detecting malware.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
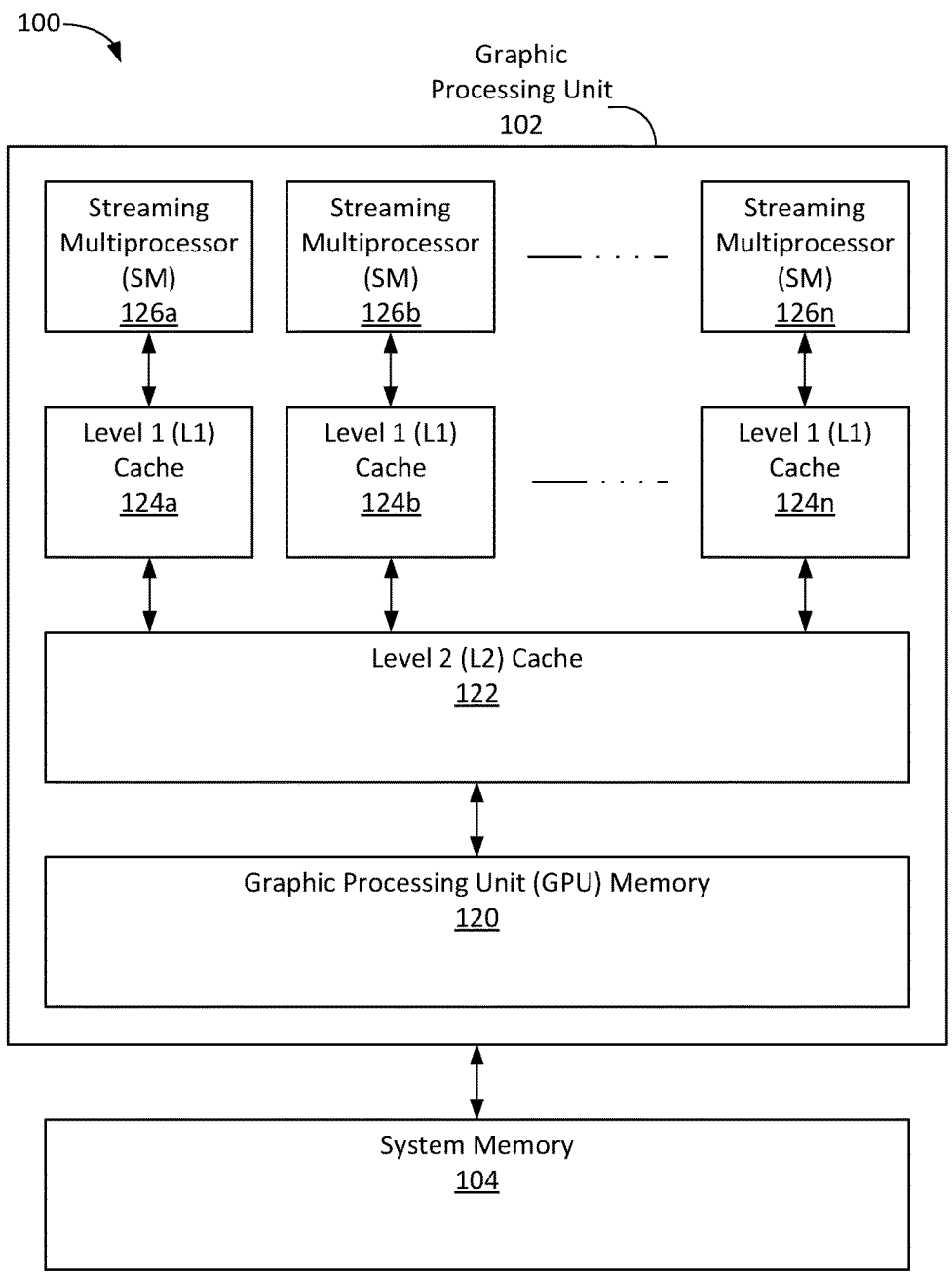
FIG. 1 is a block diagram of an exemplary system environment in which a sparse data processor may be used, according to some embodiments.

FIG. 1 is a block diagram of an exemplary system environment 100 in which a sparse data processor may be used. The system environment 100 includes a graphics processing unit (GPU) 102 communicatively coupled to a system memory 104.

GPUs, and more generally stream or vector processors, are often suited to compute data the exhibits data parallelism. For instance, GPU 102 has multiple streaming multi-processors (SMs) 126a, 126b, 126n and so forth. Due to the nature of data parallelism in some data sets, the SMs 126 may each process one or more portions of the data set in parallel with the other SMs 126. In particular, the processing of sparse data may often exhibit data parallelism and may therefore be a particularly good candidate for processing on a GPU such as GPU 102. As an example, machine learning applications sometimes generate and process sparse data. Thus, in some embodiments, the sparse data set processed by the technology is used as part of a machine learning algorithm. As another example, classifiers sometimes generate and process sparse data. Thus in some embodiments, the sparse data set processed by the technology may be used as part of a classifier.

A classifier is type of computer program that groups or classifies data along one or more dimensions. One example use case of a classifier is in the context of detecting malware. For instance, the technology disclosed herein may be used to classify incoming email as spam or legitimate correspondence. As another example, code samples may be classified as malicious or benign. Other examples include classifying domain names as trusted or suspect, computing devices as infected with malware or clean, etc. Thus, in general the technology may be used to process a sparse data set in the context of malware detection, for example as part of a backend or endpoint level anti-malware system. It is to be understood that the technology described herein can be used as part of a classifier in context other than malware detection as well.

The GPU 102 may be an internal GPU integrated into the motherboard of a computer or connected through an expansion bus. Non-limiting examples of modern expansions buses that GPU 102 may be connected through include the Peripheral Component Interconnect Express (PCIe) standard and the Accelerated Graphics Port (AGP) standard. The GPU 102 may also be an external GPU (eGPU) or may be located remotely in a distributed computing architecture.

The system memory 104 may take a variety of forms. In some embodiments, the system memory 104 may include the main memory in a single computer. In some embodiments, the system memory 104 may include a collection of memories across a distributed computing architecture. In some embodiments, the system memory 104 may include both a local main memory and a collection of memories across a distributed computing architecture.

In addition to the system memory 104, the system environment includes several layers of memory as part of the GPU 102. The GPU may include GPU memory 120, and one or more layers of cache. For instance, in the depicted GPU 102, there is a shared Level 2 (L2) cache 122 and several Level 1 (L1) caches 124a, 124b, 124n, corresponding to the SMs 126. Some embodiments may include more or fewer levels of cache. Further, some embodiments may include different variations of dedicated and shared caches.

Sparse data sets are data sets where most of the elements are zero. Because sparse data is not compact, consisting mostly of zeros, processing sparse data with GPUs or other stream or vector processors may often cause cache misses and branch misses. In some embodiments, a sparse data set may be a matrix. In some cases, the sparse data may be received in a format configured for efficient modification. As an example, the sparse data may be received as a dictionary of keys, a list of lists, or a coordinate list. In some cases, the sparse data may be received in a format configured for efficient access. As an example, the sparse data may be received as a compressed sparse row or a compressed sparse column.

The technology disclosed herein, advantageously provides a sorting method of for the sparse data based on a covariance tree that boosts GPU processing of sparse data by helping to limit the potential cache and branch misses, and thus provides an improved mechanism to utilize the computing power of GPU 102 for processing sparse data. In some embodiments, the tree may be a binary tree. In some embodiments, the tree may have 10 or fewer generations of nodes. As discussed below in, the traversing of the sparse data set is performed on the GPU 102 after preprocessing the sparse data and therefore can limit the potential cache and branch misses when the sparse data set is traversed on the GPU 102.

As discussed above, the system memory 104 and the GPU 102 may take a variety of forms. Thus the communicative coupling between the system memory 104 and the GPU 102 may also take a variety of forms. In some embodiments, the communicative coupling may take the form of a computer bus, or a series of buses communicatively coupled across bridges (e.g., a memory controller hub). In some embodiments, the communicative coupling may take the form of a computer network and layers of software protocols implementing a distributed computing platform.

As discussed below with reference to FIG. 2, the system environment 100 is only exemplary, and the technology described herein may be implemented on several different variations of the system environment 100 that provide the capability of stream or vector processing with a one or more memory levels. Specific details of utilizing the system environment 100 for processing sparse data sets, according to some embodiments, is discussed in detail with reference to FIGS. 3 and 4 below.

Figure 2:
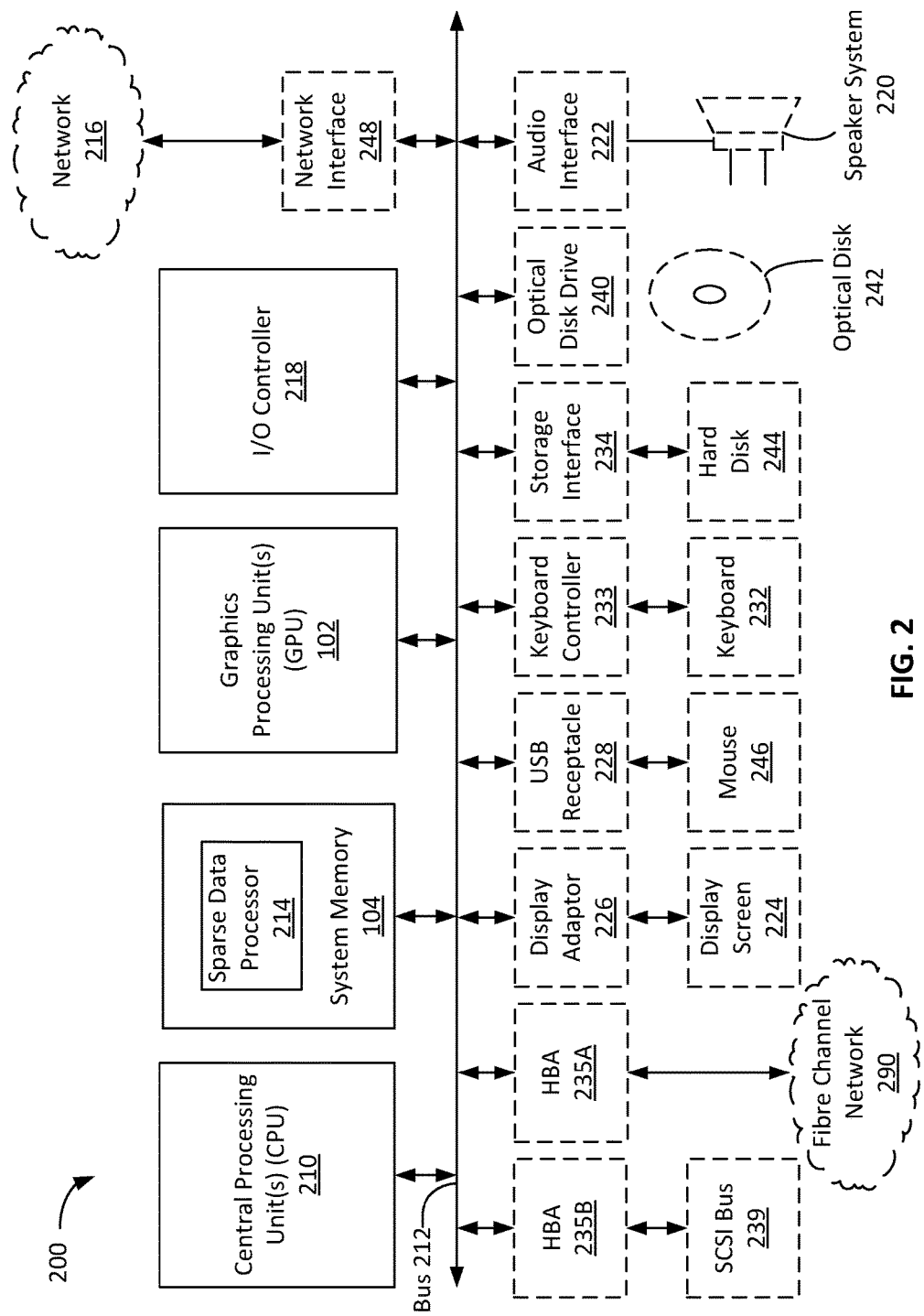
FIG. 2 is a block diagram of a computer system suitable for implementing a sparse data processor, according to some embodiments.

FIG. 2 is a block diagram of a computer system 200 suitable for implementing a sparse data processor 214. As illustrated, one component of the computer system 200 is a bus 212. The bus 212 communicatively couples other components of the computer system 200, such as at least one Central Processing Unit (CPU) 210, system memory 104 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports (not illustrated), parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a small computer system interface (SCSI) bus 239, an optical disk drive 240 configured to receive an optical disk 242, a mouse 246 (or other pointing device) coupled to the bus 212, e.g., via a USB receptacle 228, and one or more wired and/or wireless network interface(s) 248 coupling a network 216 to the computer system 200, e.g., via the bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, keyboards 232 or mice 246). The various components can be interconnected in different ways from that shown in FIG. 2.

The bus 212 allows data communication between the CPU 210, GPU 102 and system memory 104, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 104 and executed by the CPU 210. Application programs can also be loaded into system memory 104 from a remote location (i.e., a remotely located computer system 200), for example via the network interface 248. In FIG. 2, the sparse data processor 214 is illustrated as residing in system memory 104. However, in some embodiments, the sparse data processor 214 may reside, either partially or completely, in a memory external to the computer system 200 (e.g., a memory accessible via the network 216). Further, in some embodiments, the sparse data processor 214 may reside, either partially or completely, in GPU 102. Regardless of the exact residency of the sparse data processor 214, the particular workings of the sparse data processor 214 are explained in greater detail below in conjunction with FIGS. 3 and 4 below.

The storage interface 234 is coupled to one or more hard disks 244 (and/or other standard storage media). The hard disk(s) 244 may be a part of computer system 200, or may be physically separate and accessed through other interface systems.

It should be noted that the GPU 102 and the display adaptor 226 may be closely related in some embodiments. Indeed in some embodiments, the display adapter 226 and the GPU 102 may be integrated into a single unit and connected to the bus 212 as a single unit. In other embodiments, the GPU 102 may be distinct from the display adapter 226 and may even be an external device. In some embodiments, the GPU 102 may be remotely located and communicatively coupled to the bus via the network 216 and network interface 248.

Figure 3:
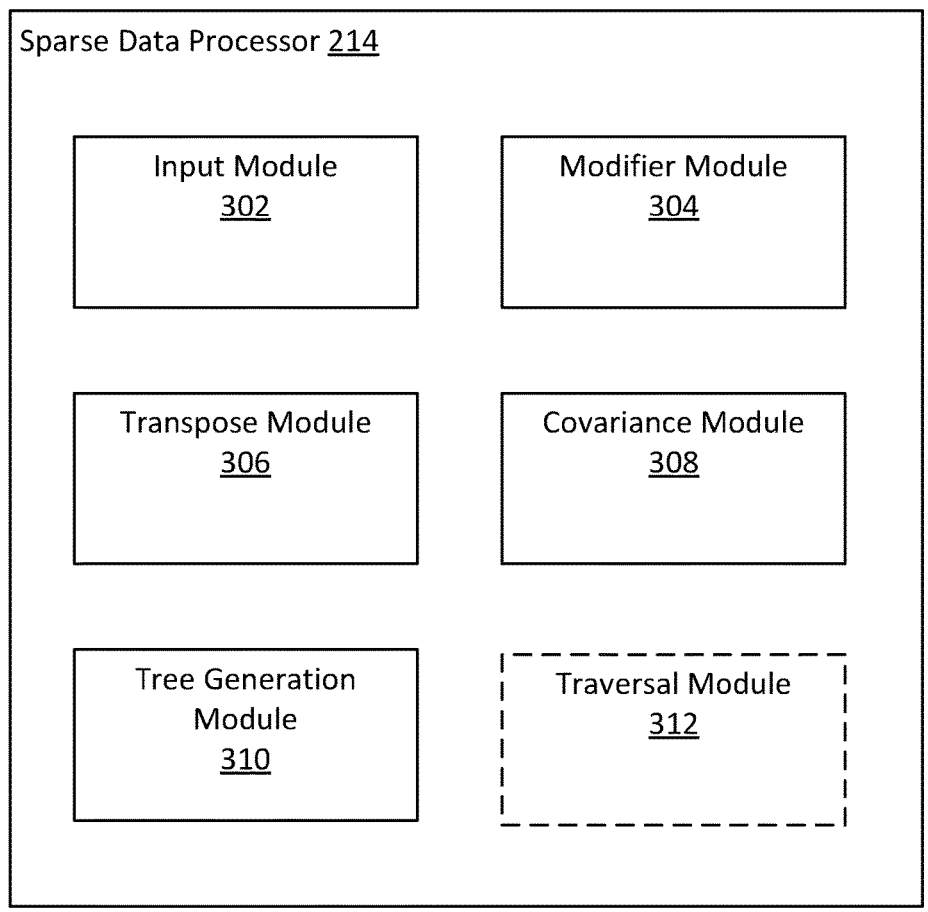
FIG. 3 is a block diagram of a sparse data processor, according to some embodiments.
Figure 4:
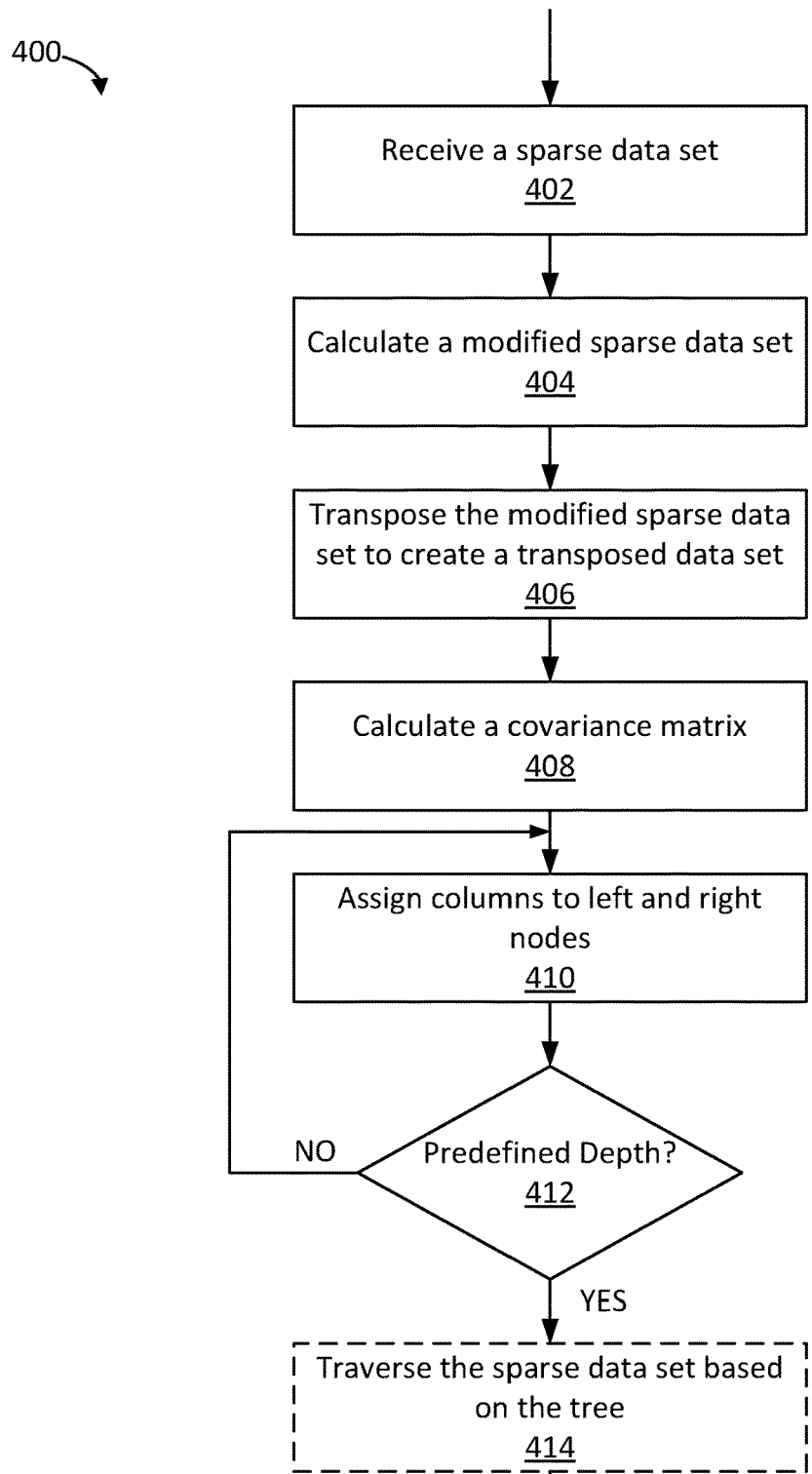
FIG. 4 is a flowchart of a method for processing sparse data sets, according to some embodiments.

For simplicity and clarity FIGS. 3 and 4 are now discussed together. FIG. 3 is a block diagram of a sparse data processor 214, whereas FIG. 4 is a flowchart of a method 400 for processing sparse data sets.

The method 400 may be implemented on a computer. For example, the method 400 may be executed on the computer system 200. The sparse data set is received 402 by the input module 302. The sparse data set may be received by the input module 302 through a variety of sources. In some embodiments, the sparse data set comes from another process executing on the CPU 210. In some instances, the input module 302 may retrieve the sparse data set from the system memory 104 or the GPU memory 120. In some embodiments, the input module 302 may include code to receive a sparse data set via the network interface 248. Regardless of the exact source, the input module 302 is configured to receive a sparse data set (e.g., a sparse input matrix A in any known sparse matrix format).

The modifier module 304 calculates 404 a modified sparse data set by replacing all nonzero values in the sparse data set with a common positive integer. In some embodiments, the common positive integer is 1. As an example, the modifier module 304 may be configured to replace all the nonzero values of an input matrix A with 1 and to create matrix B.

The modified sparse data set may then be transposed 406 by the transpose module 306 to create a transposed data set. The transpose of a matrix is an operator which flips a matrix over its diagonal. Thus, the inverse of matrix B is where the row and column indices of matrix B are switched thereby producing another matrix denoted $B^T$.

The covariance module 308 is configured to calculate 408 a covariance matrix C by multiplying the transposed data set $B^T$ by the modified sparse data set B. The computation of matrix C is advantageously quick and efficient since it is binary computation. For additional speed in executing the method 400 on the computer system 200, matrix B may be sampled by the covariance module 308 to calculate 404 an approximation for matrix C. Thus in some embodiments, the calculation of the covariance matrix C is an approximation based on a sampling of multiplication of the transposed data set $B^T$ by the modified sparse data set B.

The tree generation module 310 generates a tree by iterating to a predefined depth as indicated in decision blocks 410 and 412. On an initial pass, a root node may be generated or implied and then in block 410, columns are assigned to left and right nodes (e.g., children of the root node in the first iteration and children of previous generations of right and left nodes in subsequent iterations). In some embodiments, the sparse data processor 214 may include a database to generate the tree.

In assigning 410 columns to left and right nodes, an element of the covariance matrix C is determined by the tree generation module 310 from an unassigned set of columns to have a maximum value which corresponds to a row and a column (i, j) in the covariance matrix C. In some embodiments, the maximum value is determined by searching or sampling the input matrix A. In other embodiments, the maximum value may be determined by searching or sampling the covariance matrix C.

Further in assigning 410 columns to left and right nodes, the tree generation module 310 determines a first anchor column and a second anchor column in the sparse input data set matrix A based respectively on the row and the column in the covariance matrix C. For example, a column k may be determined that co-occurs the least with i and has frequency greater or equal to j, and columns i and k may be respectively the first anchor column and the second anchor column.

The tree generation module 310 may be configured to assign 410 to the left node columns that co-occur more with column i than with column k. The tree generation module 310 may be configured to assign 410 to the right node columns that co-occur more with column k than column i. The tree may be incrementally maintained including adding more columns dynamically without rebuilding the tree.

Lastly, as indicated by the dotted lines, the traversal module 312 may use the tree generated by the tree generation module 310 to traverse 414 the sparse data set (e.g., sparse input matrix A). For each row the traversal module 312 can be configured to scan the nonzero features and traverse the tree and add a leaf to an array. The traversal module 312 may then sort leafs of the generated tree, create an identifier by concatenating leaf identifiers, and sort the dataset according to the key.

By processing the input according to a set of rules the sparse data processor 214 can transform the source input matrix A into the tree is advantageous because branch and cache misses can be reduced, and thus improves the operation of the GPU.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for processing sparse data, at least a portion of the method being performed by a computing device comprising at least one processor, the method comprising the steps of:
receiving an input matrix, the input matrix comprising a sparse data set, all columns of the input matrix being treated as elements of a root node of a tree;
calculating a modified sparse data set by replacing all nonzero values in the input matrix with a common positive integer;
transposing the modified sparse data set to create a transposed data set;
calculating a covariance matrix by multiplying the transposed data set by the modified sparse data set;
starting from a level of the root node and continuing iteratively until a level of a predefined depth of the tree has been reached, creating and populating child nodes of each node at a current level of the tree, by performing the following steps:
determining a maximum value of a section of the covariance matrix corresponding to elements of a node for which child nodes are currently being created and populated, the maximum value being associated with a row and a column in the covariance matrix;
determining a first anchor column in the node for which child nodes are currently being created and populated based on the row corresponding to the maximum value in the section of the covariance matrix;
determining a second anchor column in the node for which child nodes are currently being created and populated based on the column in the node for which child nodes are currently being created and populated corresponding to the maximum value in the covariance matrix, the second anchor column being determined by selecting a column of the node for which child nodes are currently being created and populated that co-occurs least with the first anchor column and has a frequency greater than a column value of the column corresponding to the maximum value of the covariance matrix;
assigning to a left child node of the node for which child nodes are currently being created and populated, columns of the node for which child nodes are currently being created and populated that co-occur more with the first anchor column than the second anchor column;
assigning to a right child node of the node for which child nodes are currently being created and populated, columns of the node for which child nodes are currently being created and populated that co-occur more with the second anchor column than the first anchor column; and
using the tree as part of a machine learning classifier to detect malware.

2. The method of claim 1, further comprising traversing the input matrix based on the tree.

3. The method of claim 2, wherein the traversing of the input matrix is performed on a graphics processing unit (GPU).

4. The method of claim 1, wherein the input matrix is received as at least one of: a dictionary of keys, a list of lists, and a coordinate list.

5. The method of claim 1, wherein the input matrix is received as at least one of:
a compressed sparse row, and a compressed sparse column.

6. The method of claim 1, wherein the calculation of the covariance matrix is an approximation based on a sampling of multiplication of the transposed data set by the modified sparse data set.

7. The method of claim 1, wherein the tree is a binary tree with less than or equal to 10 generations of nodes.

8. The method of claim 1, wherein the common positive integer is 1.

9. A computer system for processing sparse data sets, the computer system comprising:
memory;
an input module residing in the memory, the input module being programmed to receive an input matrix, the input matrix comprising a sparse data set, all columns of the input matrix being treated as elements of a root node of a tree;
a modifier module residing in the memory, the modifier module being programmed to calculate a modified sparse data set by replacing all nonzero values in the input matrix with a common positive integer;
a transpose module residing in the memory, the transpose module being programmed to transpose the modified sparse data set to create a transposed data set;
a covariance module residing in the memory, the covariance module being programmed to calculate a covariance matrix by multiplying the transposed data set by the modified sparse data set;
a tree generation module residing in the memory, the tree generation module being programmed to:
create and populate child nodes of each node at a current level of the tree starting from a level of the root node and continuing iteratively until a level of a predefined depth of the tree has been reached;
determine a maximum value of a section of the covariance matrix corresponding to elements of a node for which child nodes are currently being created and populated, the maximum value being associated with a row and a column in the covariance matrix;
determine a first anchor column in the node for which child nodes are currently being created and populated based on the row corresponding to the maximum value in the section of the covariance matrix;
determine a second anchor column in the node for which child nodes are currently being created and populated based on the column in the node for which child nodes are currently being created and populated corresponding to the maximum value in the covariance matrix, the second anchor column being determined by selecting a column of the node for which child nodes are currently being created and populated that co-occurs least with the first anchor column and has frequency greater than a column value of the column corresponding to the maximum value of the covariance matrix;
assign to a left child node of the node for which child nodes are currently being created and populated, columns of the node for which child nodes are currently being created and populated that co-occur more with the first anchor column than the second anchor column, assign to a right child node of the node for which child nodes are currently being created and populated, columns of the node for which child nodes are currently being created and populated that co-occur more with the second anchor column than the first anchor column;

a classifier configured to use the tree as part of a machine learning classifier to detect malware; and at least one processor configured to execute the modules.

10. The computer system of claim 9, further comprising a traversal module residing in the memory, the traversal module being programmed to traverse the input matrix based on the tree.

11. The computer system of claim 10, wherein the traversing of the input matrix is performed on a graphics processing unit (GPU).

12. The computer system of claim 9, wherein the calculation of the covariance matrix is an approximation based on a sampling of multiplication of the transposed data set by the modified sparse data set.

13. The computer system of claim 9, wherein the tree is a binary tree with less than or equal to 10 generations of nodes.

14. At least one non-transitory computer readable-storage medium for indirect authentication, the at least one non-transitory computer readable-storage medium storing computer executable instructions that, when loaded into computer memory and executed by at least one processor of a computing device, cause the computing device to:

receive an input matrix, the input matrix comprising a sparse data set, all columns of the input matrix being treated as elements of a root node of a tree;

calculate a modified sparse data set by replacing all nonzero values in the input matrix with a common positive integer;

transpose the modified sparse data set to create a transposed data set;

calculate a covariance matrix by multiplying the transposed data set by the modified sparse data set;

starting from a level of the root node and continuing iteratively until a level of a predefined depth of the tree has been reached, creating and populating child nodes of each node at a current level of the tree, by performing the following steps:

determining a maximum value of a section of the covariance matrix corresponding to elements of a node for which child nodes are currently being created and populated, the maximum value being associated with a row and a column in the covariance matrix;

determining a first anchor column in the node for which child nodes are currently being created and populated based on the row corresponding to the maximum value in the section of the covariance matrix;

determining a second anchor column in the node for which child nodes are currently being created and populated based on the column in the node for which child nodes are currently being created and populated corresponding to the maximum value in the covariance matrix, the second anchor column being determined by selecting a column of the node for which child nodes are currently being created and populated that co-occurs least with the first anchor column and has a frequency greater than a column value of the column corresponding to the maximum value of the covariance matrix;

assigning to a left child node of the node for which child nodes are currently being created and populated, columns of the node for which child nodes are currently being created and populated that co-occur more with the first anchor column than the second anchor column;

assigning to a right node of the node for which child nodes are currently being created and populated, columns of the node for which child nodes are currently being created and populated that co-occur more with the second anchor column than the first anchor column; and using the tree as part of a machine learning classifier to detect malware.

* * * * *